US008339768B2

(12) United States Patent
Park et al.

(10) Patent No.: US 8,339,768 B2
(45) Date of Patent: Dec. 25, 2012

(54) ELECTRODE FOR SUPER-CAPACITOR, SUPER-CAPACITOR INCLUDING ELECTRODE, AND METHOD FOR PREPARING ELECTRODE

(75) Inventors: Jin-hwan Park, Seoul (KR); Sung-ho Park, Suwon-si (KR); Tae-yeon Shin, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 279 days.

(21) Appl. No.: 12/708,788

(22) Filed: Feb. 19, 2010

(65) Prior Publication Data

US 2010/0238607 A1    Sep. 23, 2010

(30) Foreign Application Priority Data

Mar. 17, 2009  (KR) .................. 10-2009-0022753

(51) Int. Cl.
*H01G 9/00* (2006.01)

(52) U.S. Cl. ........ 361/502; 361/503; 361/504; 361/509; 361/512; 361/519

(58) Field of Classification Search .......... 361/502, 361/503–504, 509, 512, 516–519, 303–305, 361/311–313, 510
See application file for complete search history.

(56) References Cited

U.S. PATENT DOCUMENTS

| 7,875,219 B2 * | 1/2011 | Zhamu et al. ............. 264/29.1 |
| 2010/0284125 A1 * | 11/2010 | Moon et al. ................. 361/305 |

FOREIGN PATENT DOCUMENTS

| JP | 2002-180370 | 6/2002 |
| KR | 10-2006-0040990 | 5/2006 |
| KR | 10-2008-0066495 | 7/2008 |

* cited by examiner

*Primary Examiner* — Nguyen T Ha
(74) *Attorney, Agent, or Firm* — Stein McEwen, LLP

(57) ABSTRACT

An electrode for a super-capacitor, a super-capacitor including the electrode, and a method of preparing the electrode in which the electrode includes a conductive substrate; metal nano structures formed on the conductive substrate; and a metal oxide coated on the metal nano structures. The electrode for the super-capacitor increases the capacitance of the super-capacitor.

9 Claims, 9 Drawing Sheets

PANI DEPOSITION → DRYING & SPACE WIDENING → Au/Ag DEPOSITION → PANI & Ag DISSOLUTION

AAO DISSOLUTION → Au NANO TUBES → MnO₂ COATING → NAFION COATING

ELECTRODE FOR SUPER-CAPACITOR, SUPER-CAPACITOR INCLUDING ELECTRODE, AND METHOD FOR PREPARING ELECTRODE

CROSS-REFERENCE TO RELATED APPLICATION

This application claims the benefit of Korean Patent Application No. 10-2009-0022753, filed Mar. 17, 2009 in the Korean Intellectual Property Office, the disclosure of which is incorporated herein by reference.

BACKGROUND

1. Field

The following description relates to an electrode for a super-capacitor, a super-capacitor including the same, and a method of preparing the electrode.

2. Description of the Related Art

Examples of energy storage devices using an electrochemical principle include secondary batteries and electrochemical capacitors. Secondary batteries have high energy density per unit weight or unit volume, but have a short lifetime, a long charging time, and a low power output density. Electrochemical capacitors are super-capacitors that have a specific capacitance at least 1000 times greater than that of a conventional electrostatic capacitor. Also, electrochemical capacitors have a long lifetime, a short charging time, and a high power output density, but have a low energy density.

Electrochemical capacitors can be categorized into electric double layer capacitors, which use an electric double layer principle, and pseudocapacitors, which use a pseudocapacitance generated by an electrochemical Faraday's reaction. Pseudocapacitors have a specific capacitance at least ten times greater than that of electric double layer capacitors.

Electrodes used in pseudocapacitors include metal oxides, which enable charging/discharging at the surface of a metal oxide layer through an oxidation-reduction reaction. The oxidation-reduction reaction occurs only at the surface of a metal oxides layer. Thus, when the surface area of a metal oxide layer is larger, the metal oxide layer stores a larger potential. Thus, an electrode that has such a structure that maximizes the surface area of a metal oxide layer is required.

SUMMARY

Aspects of the invention provide an electrode that includes a metal nano structure and is used in a super-capacitor, a super-capacitor including the electrode, and a method of manufacturing the electrode.

Additional aspects will be set forth in part in the description which follows and, in part, will be apparent from the description, or may be learned by practice of the presented embodiments.

According to one or more embodiments, an electrode for a super-capacitor includes a conductive substrate; metal nano structures formed on the conductive substrate; and a metal oxide layer formed on the metal nano structures.

According to one or more embodiments, a super-capacitor includes the electrode for a super-capacitor.

According to one or more embodiments, a method of manufacturing an electrode for a super-capacitor includes: coating a first metal on a surface of a porous template to form a first metal layer, the porous template having regularly arranged nanopores, and the first metal layer closing ends of each of the nanopores of the porous template; forming conducting polymer rods on the first metal layer in the nanopores of the porous template; etching a portion of the porous template to form spaces between the conducting polymer rods and surfaces of the nanopores; forming metal nanotubes including the first metal and a second metal in the spaces; selectively etching the conducting polymer rods, the second metal, and the porous template to form porous metal nanotubes formed of the first layer; coating a metal oxide on the porous metal nanotubes to form a metal oxide layer.

According to one or more embodiments, a method of manufacturing an electrode for a super-capacitor includes: coating a first metal on a surface of a porous template to form a first metal layer, the porous template having regularly arranged nanopores, and the first metal layer closing ends of each of the nanopores of the porous template; forming metal nanorods on the first metal layer in the nanopores of the porous template; etching the porous template; and coating a metal oxide on the metal nanorods to form a metal oxide layer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of embodiments thereof, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, an electrode for a super-capacitor, a super-capacitor including the electrode, and a method of preparing the electrode will be described in detail in accordance with aspects of the invention.

According to aspects, an electrode for a super-capacitor includes a conductive substrate; metal nano structures formed on the conductive substrate; and a metal oxide layer formed on the metal nano structures, wherein the metal oxide layer includes a metal oxide.

In the electrode for a super-capacitor, the metal nano structures have high conductivity and a three-dimensional nanostructure. Due to the three-dimensional nanostructure, the metal oxide layer on the metal nano structures may have an increased surface area. Thus, the capacitance of the electrode is substantially increased. The metal nano structures may be a three-dimensional nano structure.

According to aspects, the metal nano structures may be porous. Since the metal nano structures are porous, a larger surface area is obtained in the same volume. Thus, the metal oxide layer formed by coating a metal oxide on the porous metal nano structures may have an increased surface area.

According to aspects, the metal nano structures may be arranged perpendicular to the conductive substrate. When the metal nano structures are arranged perpendicular to the conductive substrate, the number of metal nano structures disposed in a unit area of the conductive substrate may be increased. Thus, the amount of the metal oxide present in the unit area of the conductive substrate may also be increased.

In the electrode, the metal nano structures may be a metal nanorod, a metal nanotube, or a mixture thereof. The metal nanorod or the metal nanotube may be porous. For example, the metal nanotube may contain a plurality of pores or apertures passing through outer and inner walls of the metal nanotube. Thus, the porous metal nanotube may have a cylindrical mesh structure.

In the electrode, the metal nano structures may include at least one metal selected from the group consisting of Au, Ag, Ni, Cu, Pt, Ru, Mn, and Li, and any combinations thereof. Aspects are not limited thereto such that the metal nano structures may include any metal that has high conductivity.

In the electrode, the metal oxide may include at least one metal oxide selected from the group consisting of $RuO_2$, $MnO_2$, $IrO_2$, $NiO_x$ (0<x<2), and $CoO_x$ (0<x<2), and any combinations thereof. $RuO_2$ has a high capacitance of 720/g, but is expensive. $MnO_2$ has a relatively low capacitance, but is inexpensive.

The electrode may further include a porous polymer coated on the metal oxide layer. The porous polymer may be a binder that allows the metal oxide to be stably fixed to the metal nano structures. Accordingly, the porous polymer may improve durability and rigidity of the electrode for a super-capacitor. In addition, due to the porous characteristic of the porous polymer, the metal oxide may be directly exposed to an electrolytic solution. The porous polymer coated on the metal oxide layer may include at least one selected from the group consisting of NAFION®, ACIPLEX®, FLEMION®, and DOW®, and any combinations thereof.

A super-capacitor according to aspects includes the electrode described above. Due to the inclusion of the electrode described above, the super-capacitor may have an increased capacitance.

The super-capacitor may include a cathode, an anode, an electrolytic solution, and a separator. The cathode may be the electrode according to aspects. The anode may be the same as or different from the cathode.

The electrolytic solution includes a solvent and the solvent may include at least one solvent selected from the group consisting of acetonitril, dimethylketone, and propylenecarbonate, and any combinations thereof, but aspects are not limited thereto. The electrolytic solution includes an electrolyte and the electrolyte may be an alkali metal salt that has solubility of about 0.01 mole/L or more with respect to the solvent and is electrically inactive within an operating voltage range of the super-capacitor. For example, the electrolyte may be lithium percolate, lithium tetrafluoroborate, or lithium hexafluorophosphate, and any combinations thereof, but aspects are not limited thereto. The electrolytic solution may further include an additive for improving the properties of the super-capacitor. Examples of the additive may include a stabilizer or a thickener.

The separator may be disposed between the cathode and the anode so as to divide an inner space of the super-capacitor and prevent short-circuits between the cathode and the anode.

A method of manufacturing an electrode for a super-capacitor, according to aspects, includes: coating a first metal on a surface of a porous template to form a first metal layer, the porous template having regularly arranged nanopores, and the first metal layer closing ends of each of the nanopores of the porous template; forming conducting polymer rods on the first metal layer in the nanopores of the porous template; etching a portion of the porous template to form spaces between the conducting polymer rods and surfaces of the nanopores; forming metal nanotubes including the first metal and a second metal in the space; selectively etching the conducting polymer rods, the second metal, and the porous template to form porous metal nanotubes formed of the first metal; and coating a metal oxide on the porous metal nanotubes to form a metal oxide layer.

In the methods, each of the nanopores of the porous template may be in the form of a channel. In other methods, a nanopore may be a nanopore channel that extends through opposite ends of the template (see FIGS. 1A and 1B).

Figure 1A:
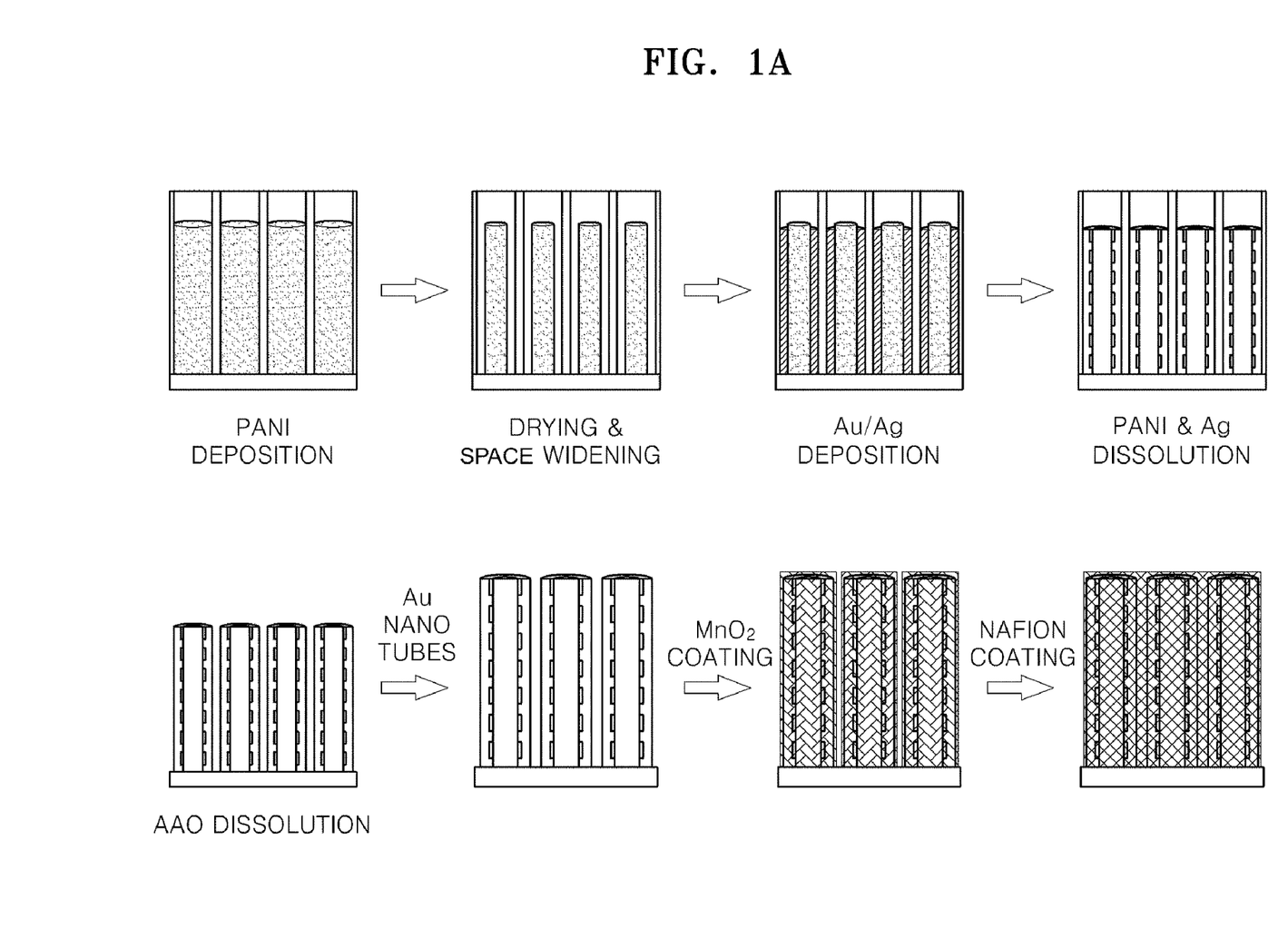
FIG. 1A is a schematic diagram showing formation of an electrode including porous gold nanotubes according to Example 1.

In forming nanotubes as shown in FIG. 1A, a first metal layer may be formed on a surface of the porous template having the nanopores by thermal deposition or electroplating. An end of each of the nanopores may be closed by filling any possible empty space or micropores of the first metal layer by electroplating. Then, the micropores of the porous template having the surface on which the first metal layer is formed are filled with conducting polymer rods that grow along the micropores of the porous template (for example, polyaniline (PANI) Deposition as shown in FIG. 1A). The conducting polymer rods are formed using an electrochemical synthesis method. A portion of the porous template may be etched to form spaces between the conducting polymer rods and surfaces of the nanopores. Before the etching, the conducting polymer rods are formed and then dried at a temperature of about 50 to about 200° C. for about 30 minutes to about 2 hours, thereby reducing the volume of the conducting polymer rods. Thus, space between the conducting polymer rods and the surfaces of the nanopores may be partially formed.

During the drying, solvent and unreacted monomers in the conducting polymer rods are removed, and thus, the volume of the conducting polymer rods is reduced as shown in FIG. 1A as Drying and Space Widening. Metal nanotubes formed of the first metal and the second metal may fill the space formed by the etching by performing an electroplating process with a mixed solution including the first metal and the second metal (for example, Au/Ag Deposition in FIG. 1A). Then, the conducting polymer rods and the second metal are selectively etched (for example, PANI and Ag Dissolution in FIG. 1A) and the porous template is selectively etched (for example, AAO Dissolution in FIG. 1A) to form porous metal nanotubes that are formed of the first metal and are arranged perpendicular to the first metal layer. The porous metal nanotubes are coated with a metal oxide (for example, the $MnO_2$ Coating of FIG. 1A), thereby forming an electrode for a super-capacitor including the porous metal nanotubes. Further, the metal oxide coated, porous metal nanotubes may be coated with a porous polymer (for example, NAFION Coating in FIG. 1A).

A method of manufacturing an electrode for a super-capacitor, according to aspects, includes: coating a first metal on a surface of a porous template to form a first metal layer, the porous template having regularly arranged nanopores, and the first metal layer closing ends of each of the nanopores of the porous template; forming metal nanorods on the first metal layer in the nanopores of the porous template; etching the porous template; and coating a metal oxide on the metal nanorods to form a metal oxide layer.

Figure 1B:
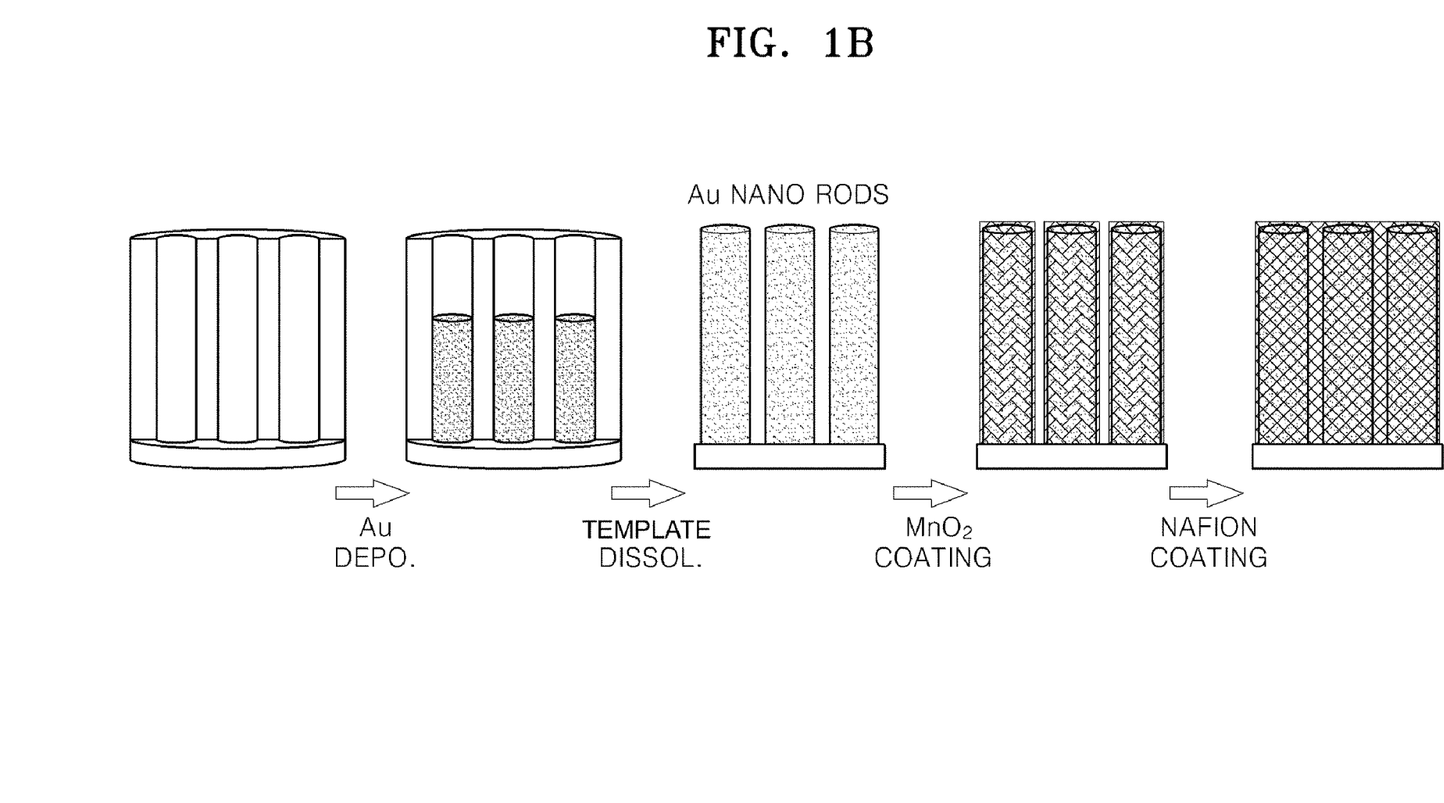
FIG. 1B is a schematic diagram showing formation of an electrode including gold nanorods according to Example 7.

As shown in FIG. 1B, the method may be used to manufacture an electrode for a super-capacitor including metal nanorods. The first metal layer may be formed on a surface of the porous template having the nanopores by thermal deposition or electroplating so as to close one end of the nanopores. Then, metal nanorods formed of the first metal are formed along the nanopores of the porous template by electroplating (for example, Au Depo. in FIG. 1B). Then, the porous template is etched (for example, Template Dissol. in FIG. 1B), thereby forming metal nanorods that are arranged perpendicular to the first metal layer and are formed of the first metal (for example, Au Nano Rods in FIG. 1B). The metal nanorods are coated with a metal oxide, thereby forming an electrode for a super-capacitor including the metal nanorods (for example, $MnO_2$ Coating in FIG. 1B). Further, the metal oxide coated metal nanorods may be coated with a porous polymer (for example, NAFION Coating in FIG. 1B).

In addition, in the method of manufacturing an electrode for a super-capacitor including metal nanorods, each of the metal nanorods may include at least two kinds of metals. When a metal nanorod formed of at least two kinds of metals is etched to remove one kind of metal contained therein, an electrode for a super-capacitor including porous metal nanorods is formed.

In the methods of manufacturing an electrode for a super-capacitor, according to aspects of the invention, the porous template may be an anodic aluminum oxide template. Also, nanopores formed in the anodic aluminum oxide template may contain open opposite ends. Thus, the anodic aluminum oxide template may contain a plurality of nanopores that extends through opposite surfaces of the anodic aluminum oxide template.

In the methods of manufacturing an electrode for a super-capacitor, the first metal may be one selected from the group consisting of Au, Ag, Ni, Cu, Pt, Ru, Mn, and Li, and any combinations thereof. The second metal may be different from the first metal and may be one selected from the group consisting of Au, Ag, Ni, Cu, Pt, Ru, Mn, and Li, and any combinations thereof.

In the method of manufacturing an electrode for a super-capacitor, the conducting polymer may include at least one selected from the group consisting of polyaniline, polythiophen, and polypyrrole, and any combinations thereof, but aspects are not limited thereto. The conducting polymer may be any conducting polymer that is synthesized using an electrochemical method.

In the methods of manufacturing an electrode for a super-capacitor, according to the above embodiments, the metal oxide may include at least one selected from the group consisting of $RuO_2$, $MnO_2$, $IrO_2$, $NiO_x$ ($0<x<2$), and $CoO_x$ ($0<x<2$), and any combinations thereof, but is not limited thereto.

The methods of manufacturing an electrode for a super-capacitor, according to aspects, may further include coating a porous polymer on the metal oxide layer. The porous polymer may include at least one selected from the group consisting of NAFION®, ACIPLEX®, FLEMION®, and DOW®, and any combinations thereof, but is not limited thereto, and may be any polymer that is porous and conductive.

Hereinafter, one or more embodiments will be described in detail with reference to the following examples. However, these examples are not intended to limit the purpose and scope of the one or more embodiments.

Manufacturing of Electrode Including Porous Metal Nanotubes

Example 1

A porous AAO template (Anodic Aluminum Oxide Template, Whatmann International Ltd.) having the entire diameter of 25 mm and containing a plurality of pore channels each having a diameter of 300 nm was provided. Gold (Au) was deposited on a surface of the porous AAO template to form an Au layer having a thickness of 200 nm to close ends of the pores of the porous AAO template and form a conductive substrate.

Then, an Au solution (Ortemp 24 RTU, Technic, Inc.) was charged into an electropolymerization apparatus (Auto Lab, PGSTAT100) including a potentiostat and the porous AAO template having the surface on which the Au layer was formed was dipped in the Au solution. Then, 0.8 $C/cm^2$ of charge was applied for 10 minutes to the porous AAO template by the electropolymerization apparatus, wherein a platinum mesh was used as a counter electrode and an Ag/AgCl electrode was used as a reference electrode at a constant voltage of −0.95 V vs. Ag/AgCl, thereby closing one end of each of the pore channels with an Au film. Then, the resultant structure was dipped in an electropolymerization apparatus (AutoLab, PGSTAT100) charged with a mixed solution including 0.5M sulfuric acid and 0.1M aniline and cyclic voltmmetry was repeatedly performed 80 times in the range of about +1.2V to about −0.2V at a scan rate of 50 mV/s, thereby polymerizing polyaniline in a rod-shape along the longitudinal direction of the respective pore channels of the porous AAO template (PANI deposition in FIG. 1A). The polymerized polyaniline contained a solvent and unreacted monomers. The porous AAO template containing pores filled with the polymerized polyaniline was dried at a temperature of 80° C. for 1 hour, thereby removing the solvent and unreacted monomers. Due to the drying, spaces between the polyaniline rods and surfaces the pores of the AAO template were partially formed (Drying and Space Widening in FIG.

1A). The dried template was placed in a 1M sodium hydroxide aqueous solution to etch the AAO template for 7 minutes, thereby widening the spaces between the polyaniline rods and the surfaces of the pores of the AAO template (Drying and Space Widening in FIG. 1A). Then, 0.25 ml of a solution including 0.25M $Na_2Co_3$ and 0.05M $KAu(CN)_2$ and 0.25 ml of a solution including 0.25M $Na_2Co_3$ and 0.05M $KAg(CN)_2$ were charged into an electropolymerization apparatus (Auto Lab, PGSTAT100) including a potentiostat and the resultant template in which the spaces were formed between nanopore channels and the polyaniline rods was dipped therein. A charge of 1 $C/cm^2$ was applied for 25 minutes to the resultant template by the electropolymerization apparatus, wherein a platinum mesh was used as a counter electrode and an Ag/AgCl electrode was used as a reference electrode, at a constant voltage of −0.95 V vs. Ag/AgCl. As a result, metal nanotubes including Au and Ag in a mole ratio of 3:1 were formed in the space between the polyaniline rods and the surfaces of the pores (Au/Ag Deposition in FIG. 1A). Then, polyaniline and Ag were selectively removed with a concentrated nitric acid (PANI and Ag Dissolution in FIG. 1A). The AAO template was etched using a 3M sodium hydroxide solution and then washed with distilled water until the pH of the distilled water used in washing was 7, thereby obtaining porous Au nanotubes that are arranged perpendicular to the Au layer (AAO Dissolution in FIG. 1A). The height of the porous Au nanotubes was 2 μm. Then, a mixed solution including 0.5M sulfuric acid and 0.1M $MnO_2$ $KAu(CN)_2$ was charged into an electropolymerization apparatus (Auto Lab, PGSTAT100) including a potentiostat and the porous Au nanotubes were dipped therein. Then, a charge of 0.05 $C/cm^2$ was applied for 30 minutes to the porous Au nanotubes by the electropolymerization apparatus, wherein a platinum mesh was used as a counter electrode and an Ag/AgCl electrode was used as a reference electrode at a constant voltage of +1.15 V vs. Ag/AgCl. As a result, the porous Au nanotube was coated with $MnO_2$ ($MnO_2$ Coating in FIG. 1A). 1.8 mM NAFION (produced by Aldrich) ethanol solution 20 $\mu L/cm^2$ was applied to the porous Au nanotube coated with $MnO_2$ and then dried at room temperature, thereby obtaining an electrode for a super-capacitor (NAFION Coating of FIG. 1A). The weight of coated $MnO_2$ per 1 $cm^2$ of the electrode was 0.05 mg.

Example 2

An electrode was formed in the same manner as in Example 1, except that the conditions were changed such that the height of porous Au nanotubes was 4 μm.

Example 3

An electrode was formed in the same manner as in Example 1, except that conditions were changed such that the height of porous Au nanotubes was 6 μm.

Example 4

An electrode was formed in the same manner as in Example 1, except that conditions were changed such that the weight of coated $MnO_2$ per 1 $cm^2$ of the electrode was 0.1 mg.

Example 5

An electrode was formed in the same manner as in Example 1, except that the conditions were changed such that the weight of coated $MnO_2$ per 1 $cm^2$ of the electrode was 0.1 mg and the height of the porous Au nanotubes was 4 μm.

Example 6

An electrode was formed in the same manner as in Example 1, except that conditions were changed such that the weight of coated $MnO_2$ per 1 $cm^2$ of the electrode was 0.1 mg and the height of the porous Au nanotubes was 6 μm.

Manufacturing of Electrode Including Metal Nanorods

Example 7

A porous AAO template (Anodic Aluminum Oxide Template, Whatmann International Ltd.) having the entire diameter of 25 mm and containing a plurality of pore channels each having a diameter of 300 nm was provided. Gold (Au) was deposited on a surface of the porous AAO template to form an Au layer having a thickness of 200 nm to close ends of the pores of the porous AAO template and form a conductive substrate.

Then, an Au solution (Ortemp 24 RTU, Technic, Inc.) was charged into an electropolymerization apparatus (Auto Lab, PGSTAT100) including a potentiostat and the porous AAO template having the surface on which the Au layer was formed was dipped in the Au solution. Then, a charge of 2.3 $C/cm^2$ was applied for one hour to the porous AAO template by the electropolymerization apparatus, wherein a platinum mesh was used as a counter electrode and an Ag/AgCl electrode was used as a reference electrode, at a constant voltage of −0.95 V vs. Ag/AgCl, thereby forming Au nanorods integrally formed with the Au layer deposited on the surface of the porous AAO template (for example, Au Depo. as shown in FIG. 1B). The Au nanorods were dipped in a 3M NaOH solution for 10 minutes to etch the porous AAO template (for example, Template Dissol. as shown in FIG. 1B), thereby manufacturing an electrode for a super-capacitor including Au nanorods which are arranged perpendicular to the Au layer. The height of the Au nanorods was 2 μm.

$MnO_2$ and NAFION were sequentially coated on the Au nanorods in the same manner as in Example 1 (for example, $MnO_2$ Coating and NAFION Coating as shown in FIG. 1B). The weight of coated $MnO_2$ per 1 $cm^2$ of the electrode was 0.05 mg.

Example 8

An electrode was formed in the same manner as in Example 7, except that conditions were changed such that the height of the Au nanorods was 4 μm.

Example 9

An electrode was formed in the same manner as in Example 7, except that conditions were changed such that the height of the Au nanorods was 6 μm.

Example 10

An electrode was formed in the same manner as in Example 7, except that conditions were changed such that the weight of coated $MnO_2$ per 1 $cm^2$ of the electrode was 0.1 mg.

Example 11

An electrode was formed in the same manner as in Example 7, except that conditions were changed such that the weight of coated $MnO_2$ per 1 $cm^2$ of the electrode was 0.1 mg and the height of the Au nanorods was 4 μm.

Example 12

An electrode was formed in the same manner as in Example 7, except that conditions were changed such that the weight of coated $MnO_2$ per 1 $cm^2$ of the electrode was 0.1 mg and the height of the Au nanorods was 6 μm.

Comparative Example 1

An electrode was formed in the same manner as in Example 2, except that $MnO_2$ and NAFION were not coated on the porous Au nanotubes. As a result, an electrode including porous Au nanotubes that were arranged perpendicular to the Au layer were not coated with $MnO_2$ and NAFION was obtained.

Comparative Example 2

An electrode was formed in the same manner as in Example 8, except that Au nanorods were not coated with $MnO_2$ and NAFION. As a result, an electrode including Au nanorods that were arranged perpendicular to the Au layer and were not coated with $MnO_2$ and NAFION was obtained.

Evaluation Example 1

Transmission Electron Microscopy (TEM) Test

Figure 2A:
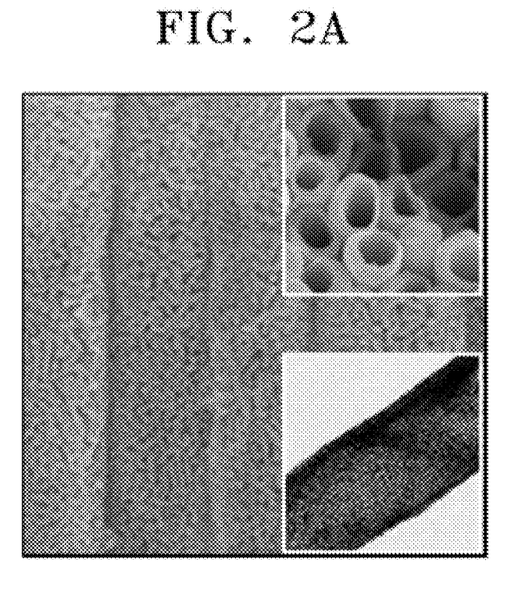
FIG. 2A is a field emission scanning electron microscopic (SEM) image of porous gold nanotubes manufactured according to Example 2 before $MnO_2$ coating. An upper smaller image in the right side of FIG. 2A is a reduced top view of the porous gold nanotubes, and a lower smaller image in the right side of FIG. 2A is an enlarged image of one porous gold nanotube.
Figure 2B:
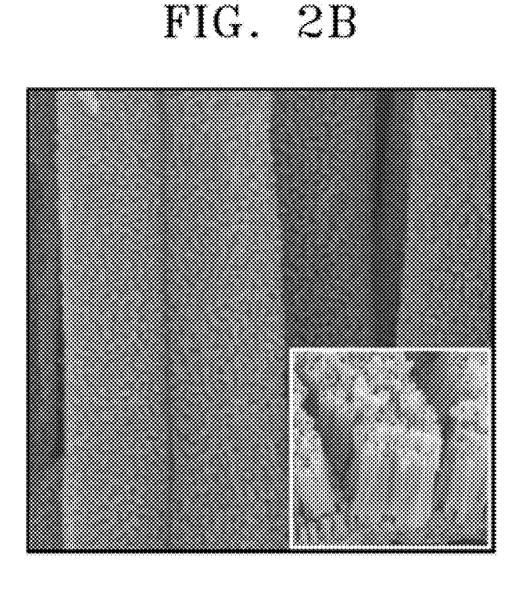
FIG. 2B is a SEM image of porous gold nanotubes manufactured according to Example 2 after $MnO_2$ coating. A smaller image in the right side of FIG. 2B is a reduced image thereof.
Figure 2C:
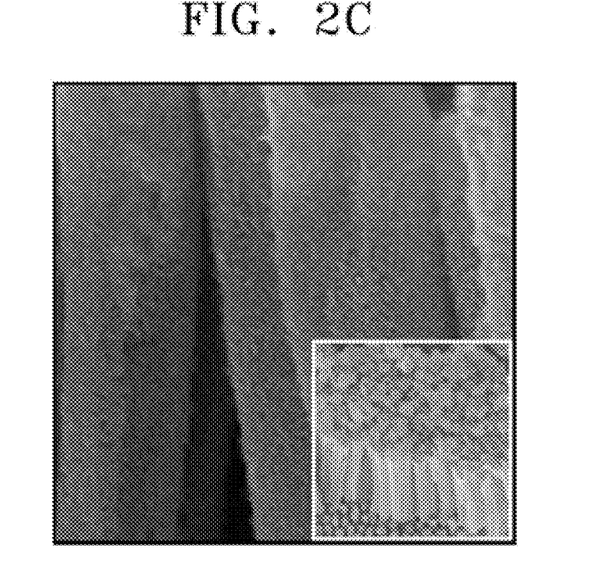
FIG. 2C is a SEM image of porous gold nanotubes manufactured according to Example 2 after NAFION coating. A smaller image in the right side of FIG. 2C is a reduced image thereof.

Images of the porous Au nanotubes manufactured according to Example 2 were obtained before $MnO_2$ coating (FIG. 2A), after $MnO_2$ coating (FIG. 2B), and after NAFION coating (FIG. 2C).

Figure 2D:
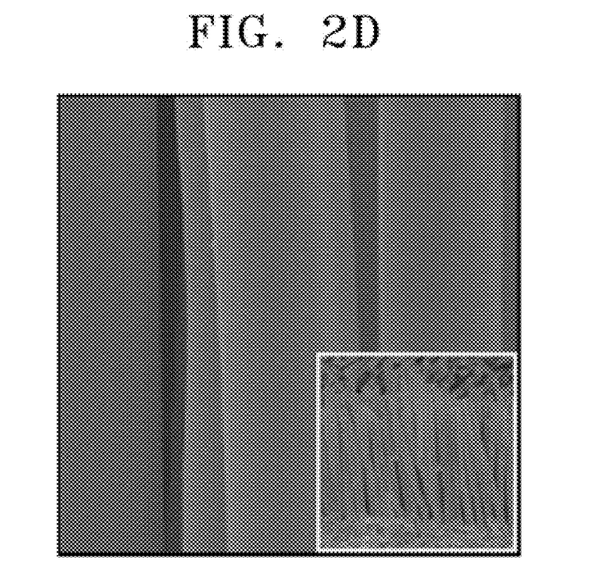
FIG. 2D is a SEM image of gold nanorods manufactured according to Example 8 before $MnO_2$ coating. A smaller image in the right side of FIG. 2D is a reduced image thereof.
Figure 2E:
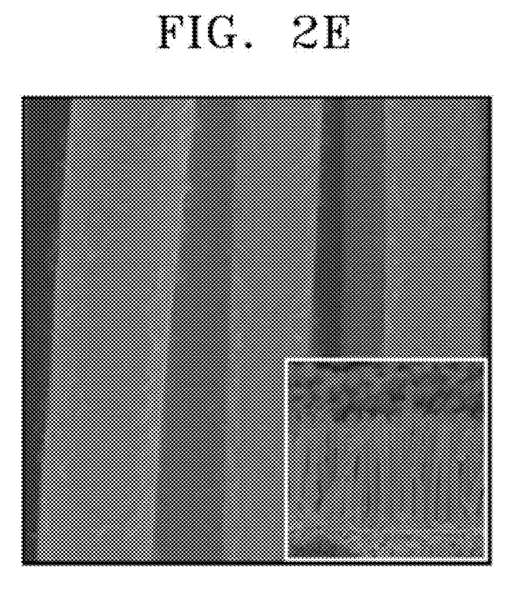
FIG. 2E is a SEM image of gold nanorods manufactured according to Example 8 after $MnO_2$ coating. A smaller image in the right side of FIG. 2E is a reduced image thereof.
Figure 2F:
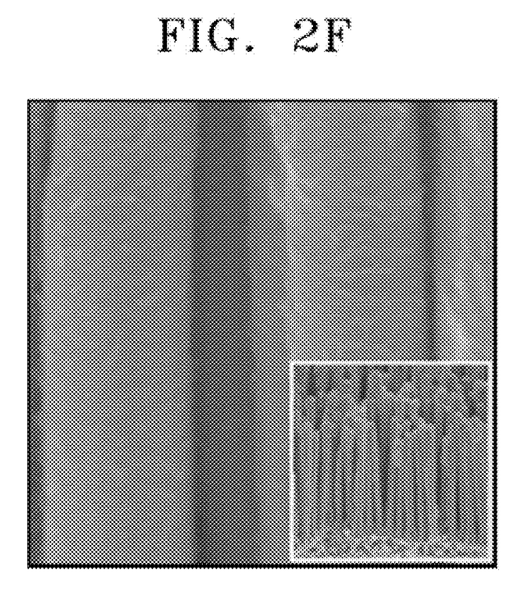
FIG. 2F is a SEM image of gold nanorods manufactured according to Example 8 after NAFION coating. A smaller image in the right side of FIG. 2F is a reduced image thereof.

Images of the Au nanorods manufactured according to Example 8 were obtained before $MnO_2$ coating (FIG. 2D), after $MnO_2$ coating (FIG. 2E), and after NAFION coating (FIG. 2F).

Referring to FIGS. 2A through 2C, it is seen that Au nanotubes were porous. On the other hand, the Au nanorods shown in FIGS. 2D through 2F were not porous.

Evaluation Example 2

Cyclic Voltammetry Test

Cyclic voltammetry was performed on an electrode including the porous Au nanotubes manufactured according to Example 2 (coated with $MnO_2$) and an electrode including the porous Au nanotubes manufactured according to Comparative Example 1 (not coated with $MnO_2$) to identify a current change with respect to a voltage change. The results are shown in FIG. 3A.

Cyclic voltammetry was performed on an electrode including the Au nanorods manufactured according to Example 8 (coated with $MnO_2$) and an electrode including the Au nanorods manufactured according to Comparative Example 2 (not coated with $MnO_2$) to identify a current change with respect to a voltage change. The results are shown in FIG. 3B.

In these experiments, a counter electrode was a platinum mesh, a reference electrode was Ag/AgCl, an electrolyte was a 1M sulfuric acid aqueous solution, and potentiostat (AutoLab, PGSTAT100) was used.

Figure 3A:
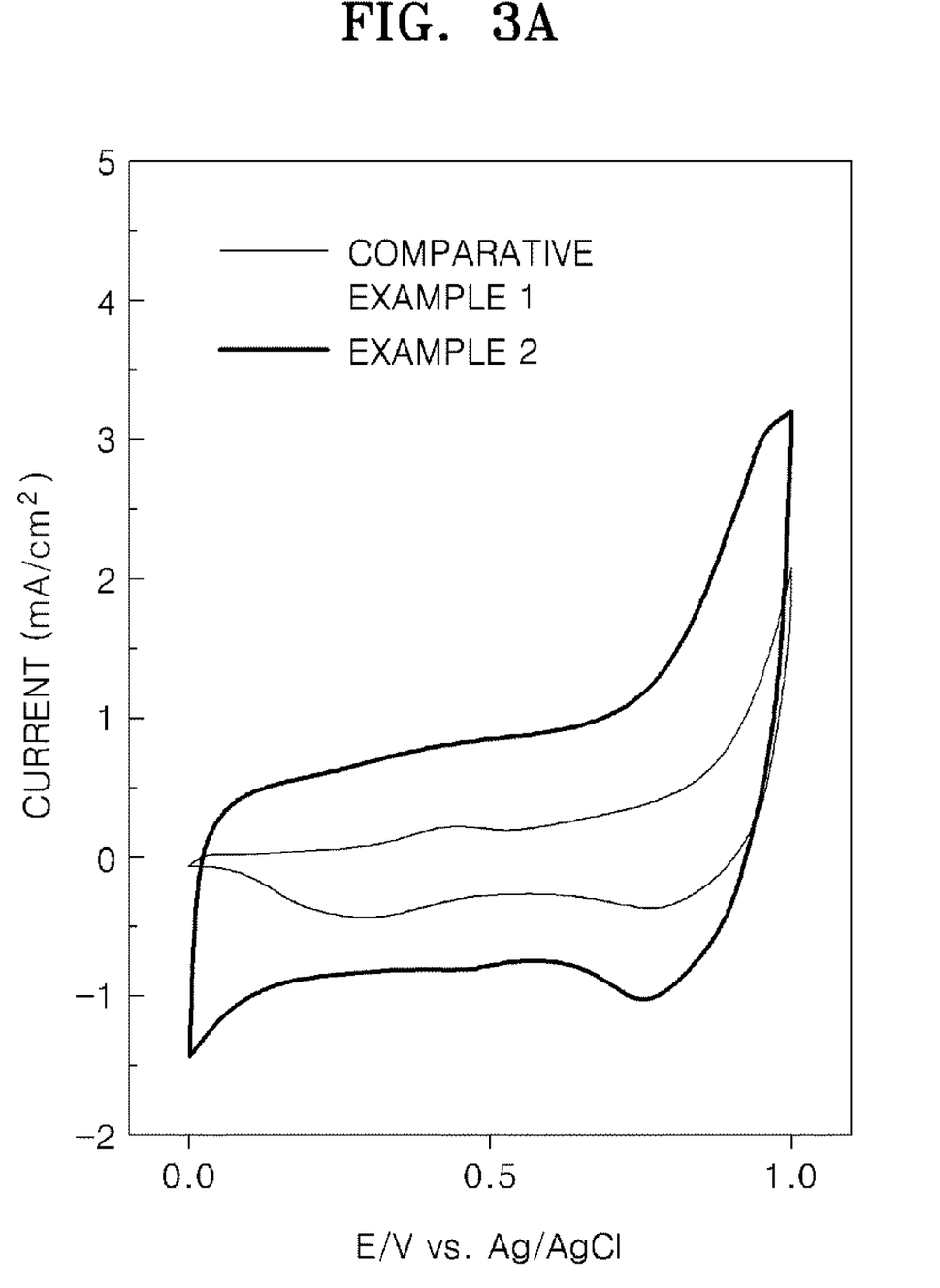
FIG. 3A is a cyclic voltammogram of electrodes manufactured according to Example 2 and Comparative Example 1.
Figure 3B:
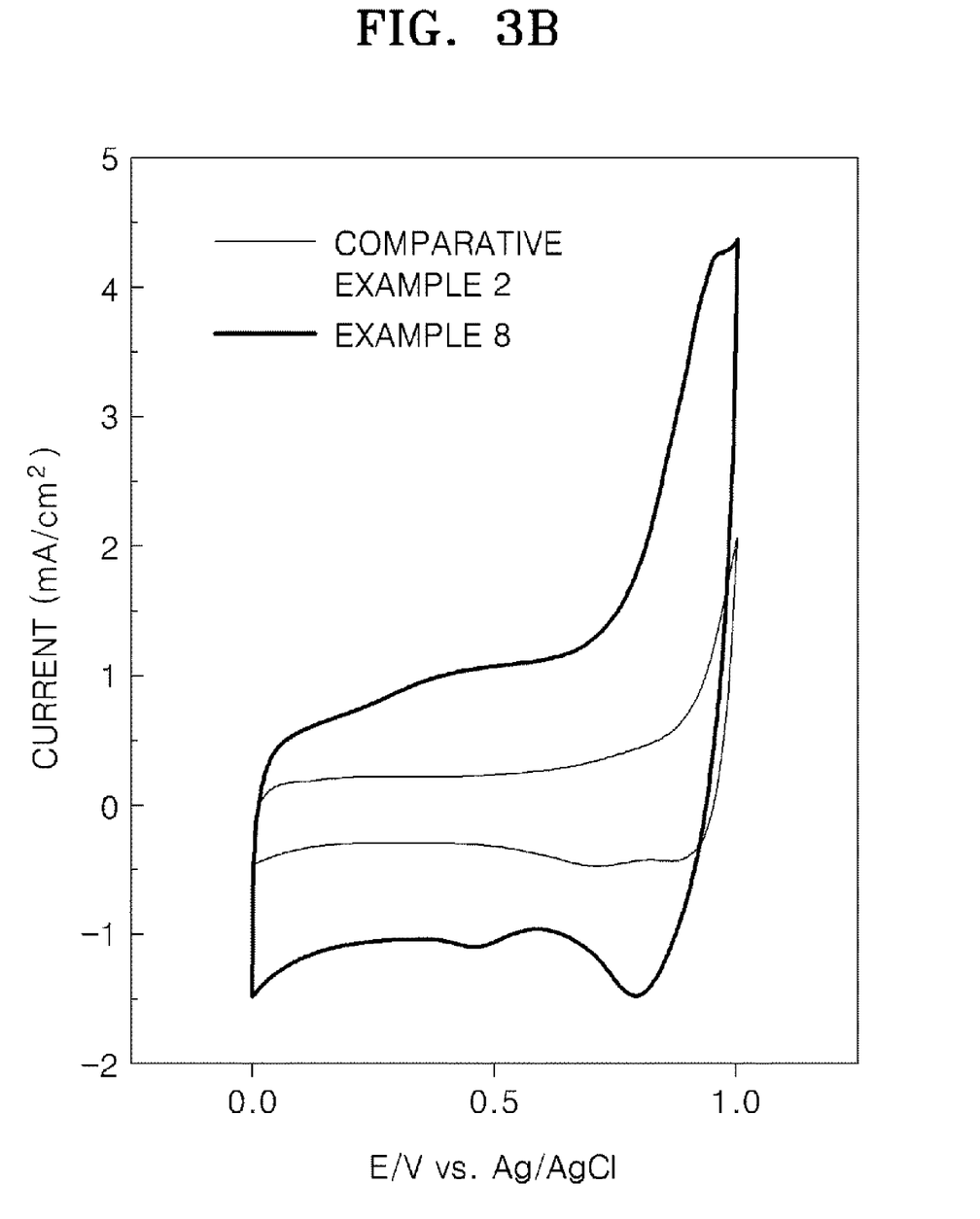
FIG. 3B is a cyclic voltammogram of electrodes manufactured according to Example 8 and Comparative Example 2.

Referring to FIGS. 3A and 3B, the electrodes manufactured according to Examples 2 and 8, which were coated with $MnO_2$, generated more current than the electrodes manufactured according to Comparative Examples 1 and 2, which were not coated with $MnO_2$. That is, when coated with $MnO_2$, more charge could be stored in the electrode.

Evaluation Example 3

Galvanostatic Charge/Discharge Test

The galvanostatic charge/discharge test was performed on the electrodes manufactured according to Examples 2 and 8 using the $MnO_2$ and NAFION-coated electrodes manufactured according to Examples 1 through 12 as a working electrode, platinum mesh as a counter electrode, Ag/AgCl as a reference electrode, 1M sulfuric acid aqueous solution as an electrolyte, and a potentiostat (AutoLab, PGSTAT100). The results are shown in FIG. 4.

Figure 4:
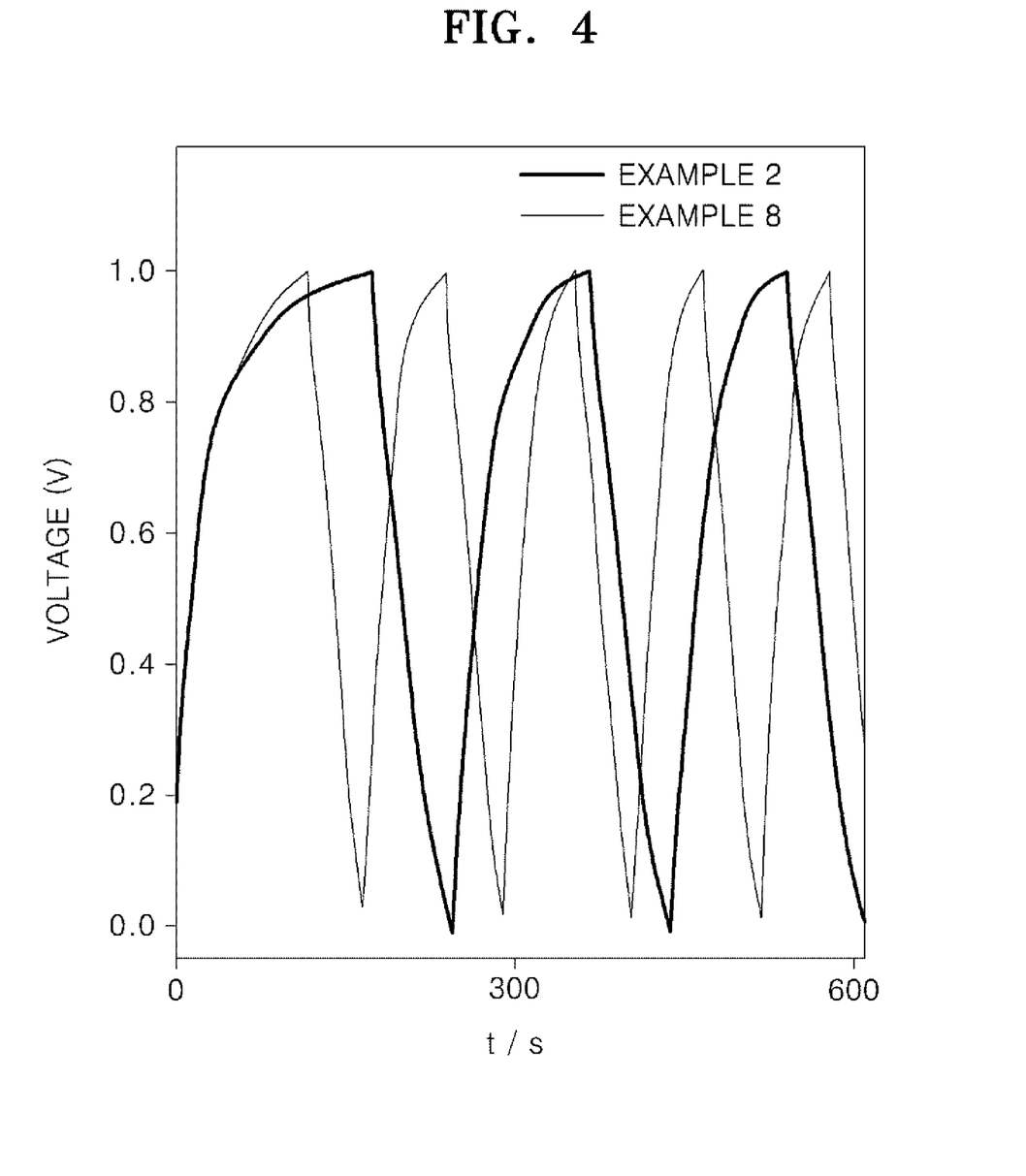
FIG. 4 is a graph showing galvanostatic charge/discharge test results of electrodes manufactured according to Examples 2 and 8.

For Examples 1 through 12, a capacitance per $MnO_2$ unit weight was measured using a slope of a voltage curve of FIG. 4 during discharging and the weight of $MnO_2$. The results are shown in FIG. 5.

Figure 5:
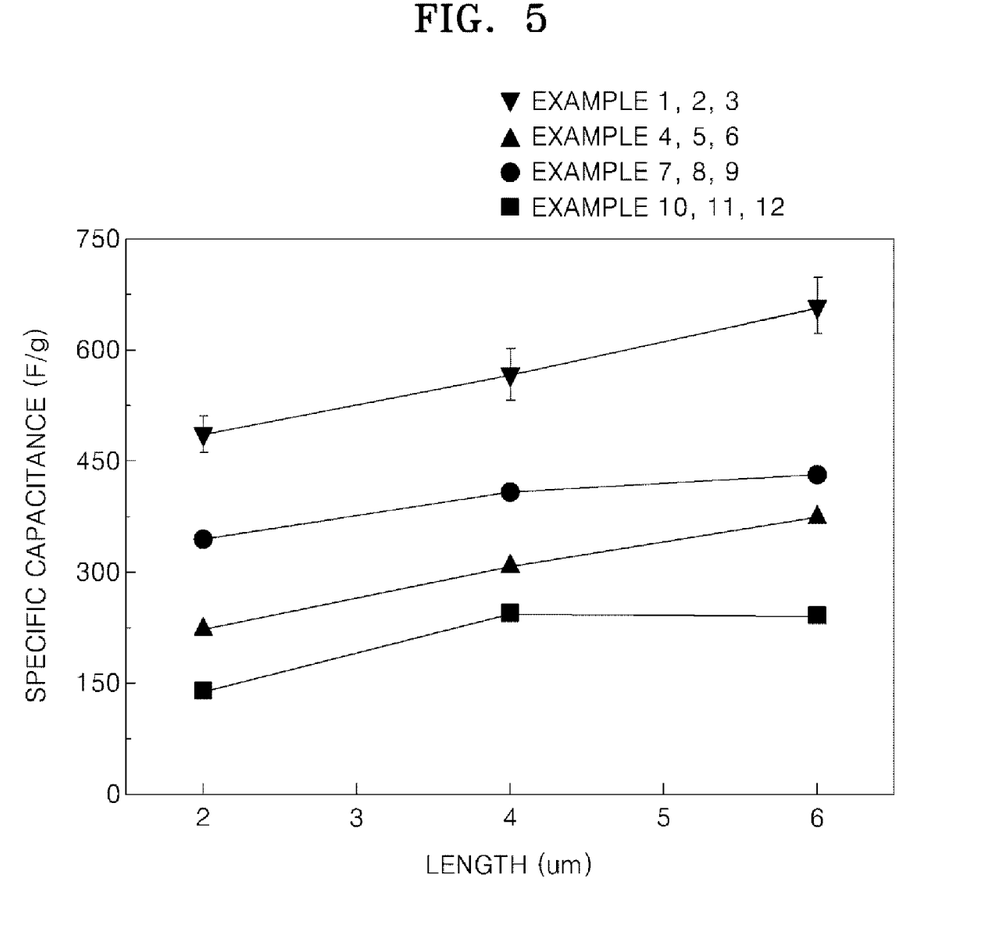
FIG. 5 is a graph of specific capacitance with respect to the length of a nano structure and the amount of $MnO_2$ used of electrodes manufactured according to Examples 1 through 12.

Referring to FIG. 5, the longer the length of a nano structure, the higher electric capacitance, and porous Au nanotubes had a higher capacitance than Au nanorods. When the amount of $MnO_2$ coated was greater than 0.05 mg, the capacitance was not further increased since some part of $MnO_2$ was not exposed.

As described above, according to the one or more of the above embodiments, due to use of a metal nano structure-containing electrode, the capacitance of the super-capacitor can be increased.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode for a super-capacitor, the electrode comprising:
   a conductive substrate;
   metal nano structures formed on the conductive substrate; and
   a metal oxide layer formed on the metal nano structures,
   wherein the metal nano structures are porous.

2. The electrode of claim 1, wherein the metal nano structures are arranged perpendicular to the conductive substrate.

3. The electrode of claim 1, wherein each of the metal nano structures is a metal nanorod.

4. The electrode of claim 1, wherein each of the metal nano structures is a metal nanotube.

5. The electrode of claim 1, wherein each of the metal nano structures comprises at least one metal selected from the group consisting of Au, Ag, Ni, Cu, Pt, Mn, Ru, Li, and any combinations thereof.

6. The electrode of claim 1, wherein the metal oxide comprises at least one selected from the group consisting of $RuO_2$, $MnO_2$, $IrO_2$, $NiO_x$ (0<x<2), and $CoO_x$ (0<x<2), and any combinations thereof.

7. The electrode of claim 1, further comprising a porous polymer coated on the metal oxide layer.

8. The electrode of claim 7, wherein the porous polymer comprises at least one selected from the group consisting of NAFION, ACIPLEX, FLEMION, DOW, and any combinations thereof.

9. A super-capacitor comprising the electrode of claim 1.

* * * * *